(12) United States Patent
Sekine

(10) Patent No.: US 6,269,359 B1
(45) Date of Patent: Jul. 31, 2001

(54) RELATIONAL DATA BASE SYSTEM AND METHOD FOR RAPIDLY REALIZING A QUERY TO A DATABASE

(75) Inventor: Yutaka Sekine, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/010,291

(22) Filed: Jan. 28, 1993

(30) Foreign Application Priority Data

Jan. 30, 1992 (JP) .................................................. 4-015224

(51) Int. Cl.[7] .................................................. G06F 17/30
(52) U.S. Cl. .................................................. 707/2; 707/10
(58) Field of Search .................................. 395/660, 700, 395/650, 601–606; 707/1–3, 10

(56) References Cited

U.S. PATENT DOCUMENTS

| | | | |
|---|---|---|---|
| 4,330,822 | * 5/1982 | Dodson | 395/600 |
| 4,769,772 | * 9/1988 | Dwyer | 395/600 |
| 4,829,427 | * 5/1989 | Green | 395/600 |
| 5,091,852 | * 2/1992 | Tsuchida et al. | 395/600 |
| 5,257,366 | * 10/1993 | Adair et al. | 395/600 |
| 5,276,870 | * 1/1994 | Shan et al. | 395/600 |
| 5,301,317 | * 4/1994 | Lohman et al. | 395/600 |
| 5,367,675 | * 11/1994 | Cheng et al. | 395/600 |
| 5,379,419 | * 1/1995 | Heffernan et al. | 395/600 |

FOREIGN PATENT DOCUMENTS

2172130  * 9/1986 (GB) .

OTHER PUBLICATIONS

"Dynamic vs. Static SQL", Digital Review, v8, n30, p46(1), Sep. 1991.*

M. Astrahan et al., "System R: A relational Approach to Database Management," *ACM Transactions on Database Systems*, vol. 1, No. 2(97–137), 1976, p. 25.

* cited by examiner

Primary Examiner—Hosain T. Alam
(74) Attorney, Agent, or Firm—Staas & Halsey LLP

(57) ABSTRACT

In a relational data base system having a function of view resolution for analyzing a query sentence in an execution procedure for a query from a user, using a content defined in a view table for the query designating the view table, converting the retrieval of the view table to that of an actual table, and creating the execution procedure, the system includes: an early bind definition unit for the view table for creating plural execution procedures in advance to realize the query to the defined view table in accordance with a query structure to the view table; a definition information dictionary operatively connected to the early bind definition means; an execution procedure management unit provided in the definition information dictionary for storing plural execution procedures to realize the query to the view table previously created; an execution procedure composition unit operatively connected to the definition information dictionary for retrieving an information of the execution procedure stored in the dictionary when receiving the query to the defined view table, extracting the execution procedure adapted to the query, and composing the extracted execution procedure with the query input from the user; and an execution unit operatively connected to the execution procedure composition unit for executing the composed execution procedure.

4 Claims, 12 Drawing Sheets

Fig. 1  PRIOR ART

QUERY TO VIEW TABLE

```
SELECT PART-NUMBER, AMOUNT-OF-STOCK
FROM STOCK-PARTS-TABLE
WHERE PART-NUMBER=100
```
B

DEFINITION OF VIEW TABLE

```
CREATE VIEW STOCK-PARTS-TABLE (NUMBER, AMOUNT-OF-STOCK)
  AS SELECT PART-NUMBER, SUM (AMOUNT-OF-STOCK)
     FROM WAREHOUSE PARTS-NUMBER
          GROUP PART-NUMBER
```
A

QUERY TO ACTUAL TABLE

```
SELECT PART-NUMBER, SUM (AMOUNT-OF-STOCK)
FROM STOCK-PARTS-TABLE
WHERE PART-NUMBER=100
GROUP PART-NUMBER
```
C

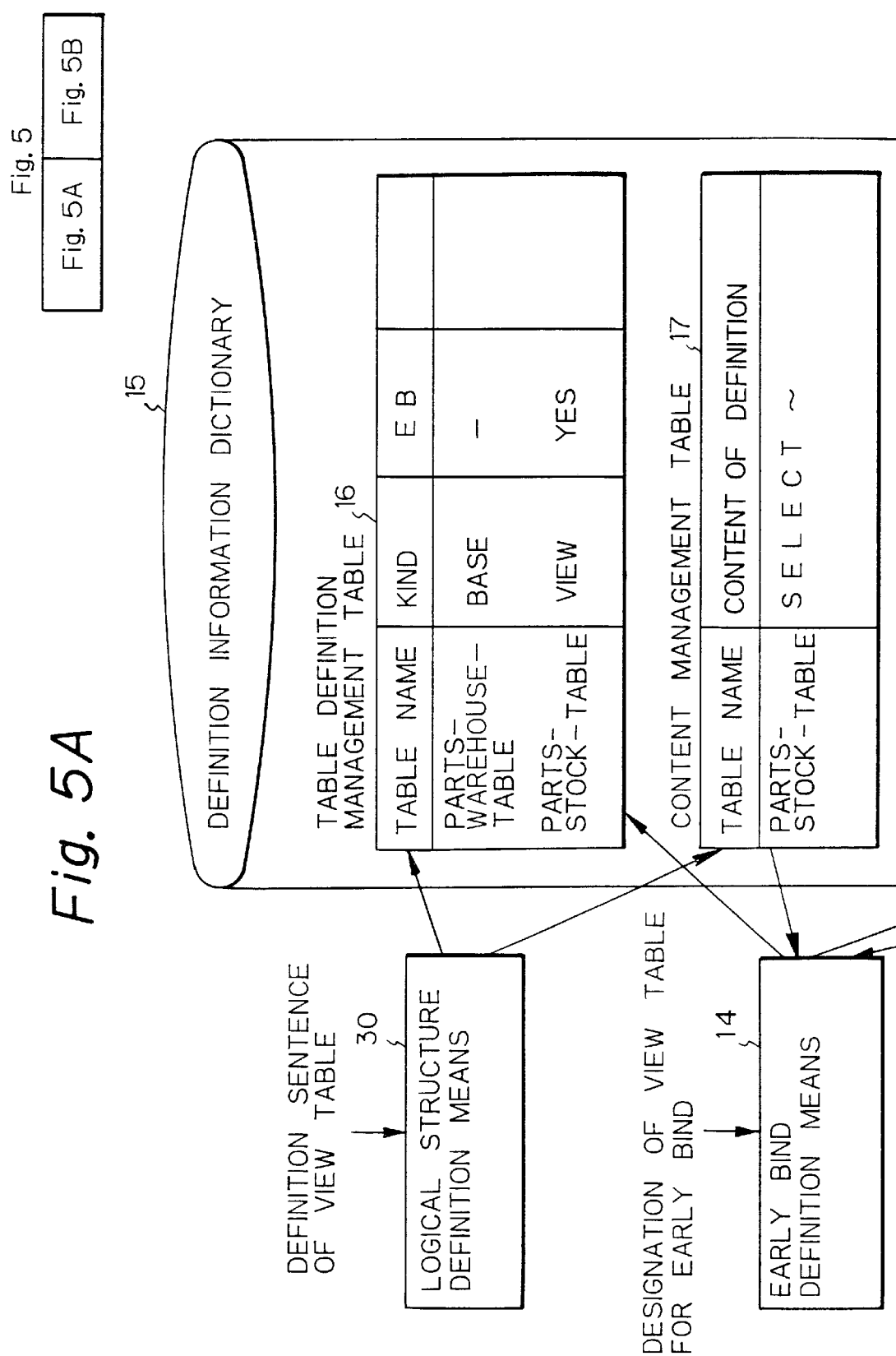

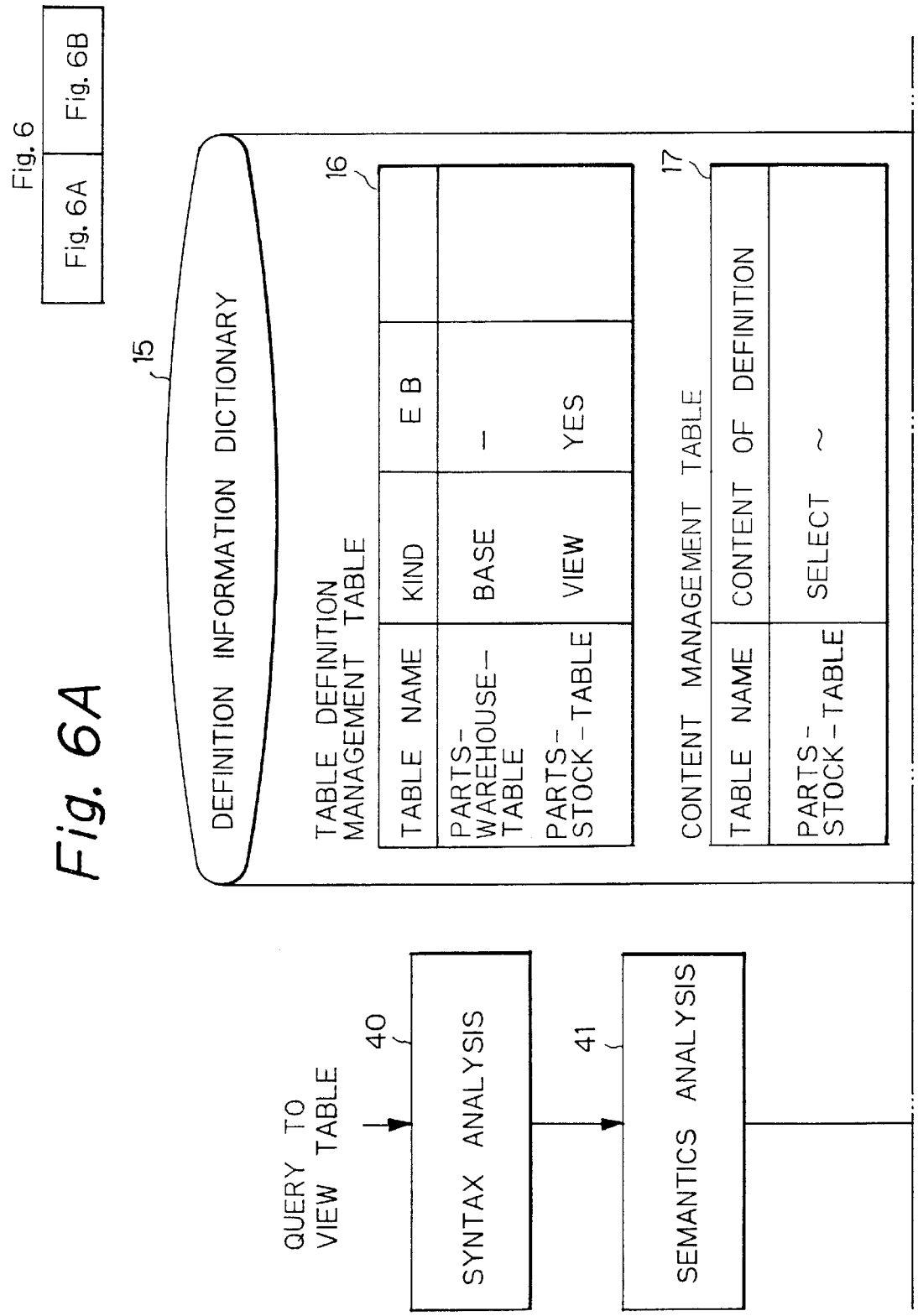

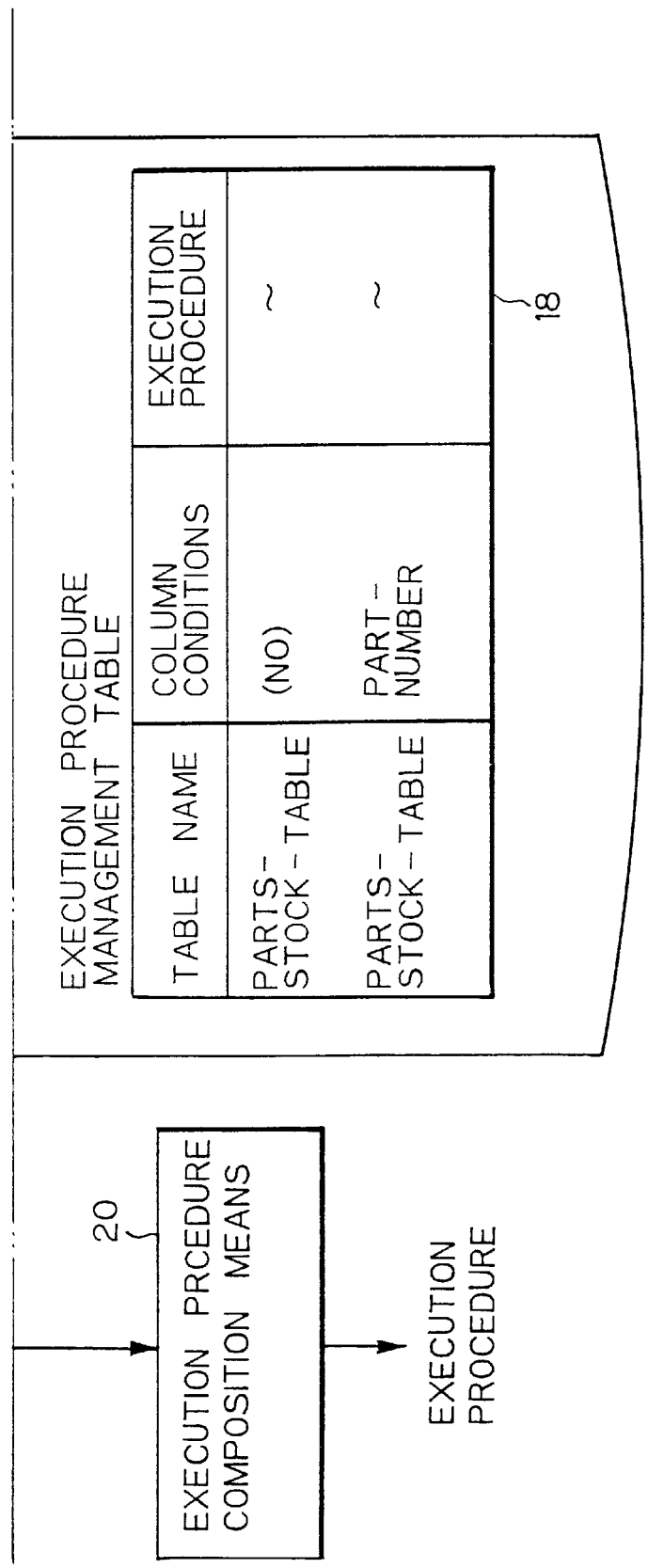

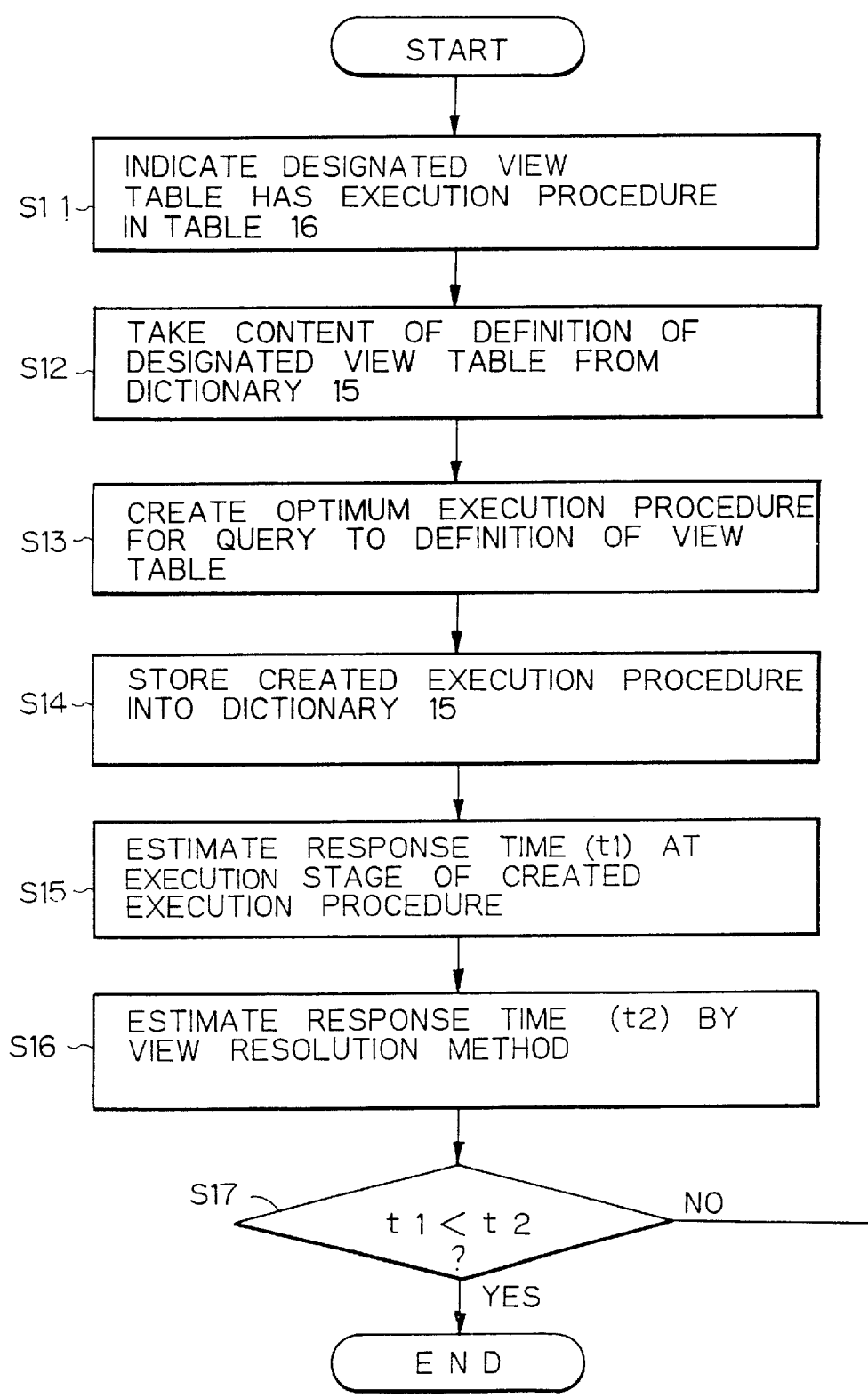

RELATIONAL DATA BASE SYSTEM AND METHOD FOR RAPIDLY REALIZING A QUERY TO A DATABASE

BACKGROUND OF THE INVENTION

1. Field of the Invention

The present invention relates to a relational data base system, and more particularly, to an improvement in an execution procedure for querying a view table in a relational data base system. In the present invention, the execution procedure, which queries the content defined in the view table, is created in advance in a definition stage of the view table. As a result, it is possible to quickly realize the execution procedure to query the content defined in the view table so that it is possible for a user to easily utilize a relational data base system.

2. Description of the Related Art

Recently, relational data base systems have developed considerably in the field of computers. A relational data base is one kind of data base with a concept of providing easy utilization of a computer for a user. In the relational data base system, various technical terms, for example, "table", "index", "view table" and the like are frequently used in realizing the execution procedure. Further, the "SQL" is usually used as an operational language. SQL is a well known simplified language designed for data base access, and is different from a programming language.

In the relational data base system, various information is presented to the user in the form of a table. Two kinds of tables are used in this system. One is an actual table which is provided in the structure of the data base, and the other is a virtual table which is based on an actual table. A view table is comprised of a part of an actual table, or by a combination of a plurality of actual tables. The user queries the view table so that it is possible to easily and quickly obtain desired information stored in the data base.

When it is necessary to analyze a query sentence in the execution stage, analysis of the query sentence must be performed as quickly as possible.

In the above case, i.e., the analysis of the query sentence in the execution stage, it is necessary for the query to the data base to be in "text format". This text format is frequently utilized in querying from a personal computer and in remote data base access between systems.

SUMMARY OF THE INVENTION

The object of the present invention is to provide a relational data base system enabling reduction of a response time for a query to a data base in the case where the query is in a text format.

In one aspect of the present invention, there is provided a relational data base system having a function of view resolution for analyzing a query sentence in an execution procedure of a query from a user, using the content defined for a view table in the query designating the view table, converting the retrieval of the view table to that of an actual table, and creating the execution procedure. The system includes: an early bind definition unit for the view table for creating plural execution procedures in advance to query the defined view table in accordance with the structure of a query to the view table; a definition information dictionary operatively connected to the early bind definition unit; an execution procedure management unit provided in the definition information dictionary for storing plural execution procedures to realize the query to the view table previously created; an execution procedure composition unit operatively connected to the definition information dictionary for retrieving information of an execution procedure stored in the dictionary when receiving a query to the defined view table, extracting the execution procedure adapted to the query, and composing the extracted execution procedure with the query input from the user; and an execution unit operatively connected to the execution procedure composition unit for executing the composed execution procedure.

In a preferred embodiment, the definition information dictionary further includes: a table definition management table holding a particular kind of table, i.e., either the actual table or the view table, and an indication of the early bind for the view table; a content management table for the view table for holding the content of the definition; and an index management table for holding the name of an index.

In a preferred embodiment, the execution procedure management table includes column conditions for a corresponding view table, and a basic execution procedure for performing content described in the corresponding column conditions.

In an another aspect of the present invention, there is provided a method for creating plural execution procedures at an early bind in a relational data base system having a function of view resolution for analyzing a query sentence in an execution procedure for a query from a user, using a content defined in a view table for the query designating the view table, converting the retrieval of the view table to that of an actual table, and creating the execution procedure. The method includes steps of: creating an optimum execution procedure for the query to the view table; holding the created execution procedure in the definition information dictionary; estimating a first response time at an execution stage of the execution procedure; estimating a minimum response time necessary for creation of the execution procedure when performing the view resolution; creating the execution procedure to in advance realize the query when the first response time is larger than the minimum response time, in predicting reduction conditions in accordance with a storage structure of the actual table for obtaining the view table; and holding the created execution procedure with the reduction conditions in the definition information dictionary.

In still another aspect of the present invention, there is provided a method for composing an execution procedure in a relational data base system having a function of view resolution for analyzing a query sentence in an execution procedure for a query from a user, using a content defined in a view table for the query designating the view table, converting the retrieval of the view table to that of an actual table, and creating the execution procedure. The method includes the steps of: analyzing the syntax of a query input by a user; referring to the definition information dictionary for the view table that is the object of the query, and determining whether or not the execution procedure was previously created; selecting the execution procedure in accordance with the result of the YES/NO of conditions for the query when the execution procedure has been previously created; and composing the execution procedure to realize the query.

BRIEF DESCRIPTION OF THE DRAWINGS

In the drawings:

FIG. 1 is an explanatory view of view resolution in a conventional art,

DESCRIPTION OF THE PREFERRED EMBODIMENTS

As mentioned above, SQL is a standard language used to query a relational data base system. The definition of a view table is described in SQL in a text format as a query sentence. Conventionally, a view table is defined by the SQL text without any change or with any small changes in the range of syntax analysis of the query sentence. As explained below, conventionally, when querying the view table, the execution procedure is created after changing the query to the actual table by using the definition of the view table. This change from a query to a view table to a query to an actual table is called "view resolution".

Figure 2:
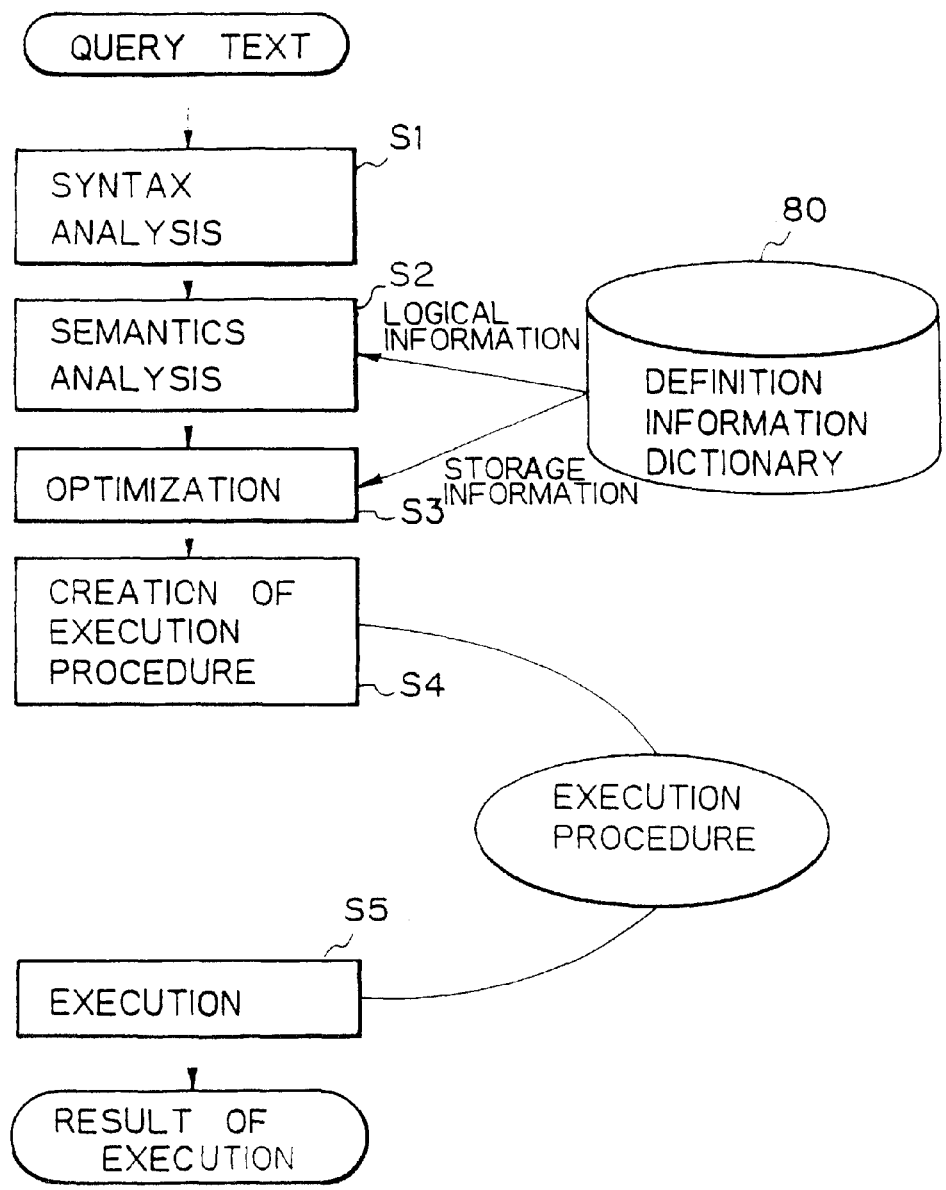
FIG. 2 is an explanatory view of a conventional execution procedure in a data base management system.

FIG. 1 (PRIOR ART) is an explanatory view of view resolution in a conventional art, and FIG. 2 (PRIOR ART) is an explanatory view of a conventional execution procedure in a data base management system. In FIG. 1, "A" shows the definition of the view table, "B" shows the query to the view table by the SQL text, and "C" shows the query to the actual table.

In FIG. 1, "SELECT", "FROM", "WHERE" and the like are keywords (statements) in the SQL text. The query to the view table of "B" is performed by a user through a keyboard (not shown). As explained above, the view resolution is performed by changing the query from the query "B" to the query "C" based on the definition "A".

For example, the data base may store a "warehouse-parts-table" as the actual table. Further, a "parts-stock-table" is defined as the view table based on this warehouse parts table. One column of the stock parts table may contain "part-numbers" and another "amount-of-stock". The above contents are defined in the view table shown by "B". The content of the view table is stored in a definition information dictionary 80 in FIG. 2.

When a user queries the view table, he creates the query text in the SQL as shown by "B", and inputs this query text to a data base management system as the query to the actual table. When the query is input, as shown in FIG. 2, the data base management system performs a syntax analysis and a semantics analysis. That is, first, the syntax of the query sentence is analyzed (step S1). Next, logical information is read from the definition information dictionary 80, and the semantics of the query are analyzed (step S2) based on the logical information. Further, in this step, it is recognized that the query is to the view table. Accordingly, the query to the view table "B" is changed to the query to the actual table "C" by using the content of the definition of the view table. This change is called "view resolution" as mentioned above.

After the above view resolution, location information regarding the actual table is read from the definition information dictionary 80, and an "optimization" process is performed to realize a high speed query. In general, optimization is carried out to decide an optimum execution procedure adapting to conditions selected by a user. As a result of the optimization, the execution procedure for the query is created (step S4), and the procedure is executed (step S5).

In this case, the result of the view resolution can be expressed by either only one query sentence, or an arrangement of multiple query sentences. As explained above, conventionally, the syntax and semantics of the query text are analyzed, the view table is changed to the actual table, the optimization is performed on the query text, and the execution procedure is created. This conventional method is called "view resolution" as mentioned repeatedly above. In this case, the execution procedure is created in either an "object language" to be reduced to machine language, or in an "intermediate text" the level of which is close to machine language.

There are, however, problems in the above conventional method, particularly, in the optimization process after the semantics analysis. That is, the creation of the execution procedure after the view resolution depends on the storage structure of the actual table, and this conventional method needs to obtain an optimum execution procedure selected from a plurality of possible execution procedures. Accordingly, a large amount of time is required for the creation of the optimum execution procedure.

In view of the above problems in the conventional art, an object of the present invention is to provide a relational data base system enabling a reduction in response time for a query to a data base in the case where the query is in a text format.

Figure 3:
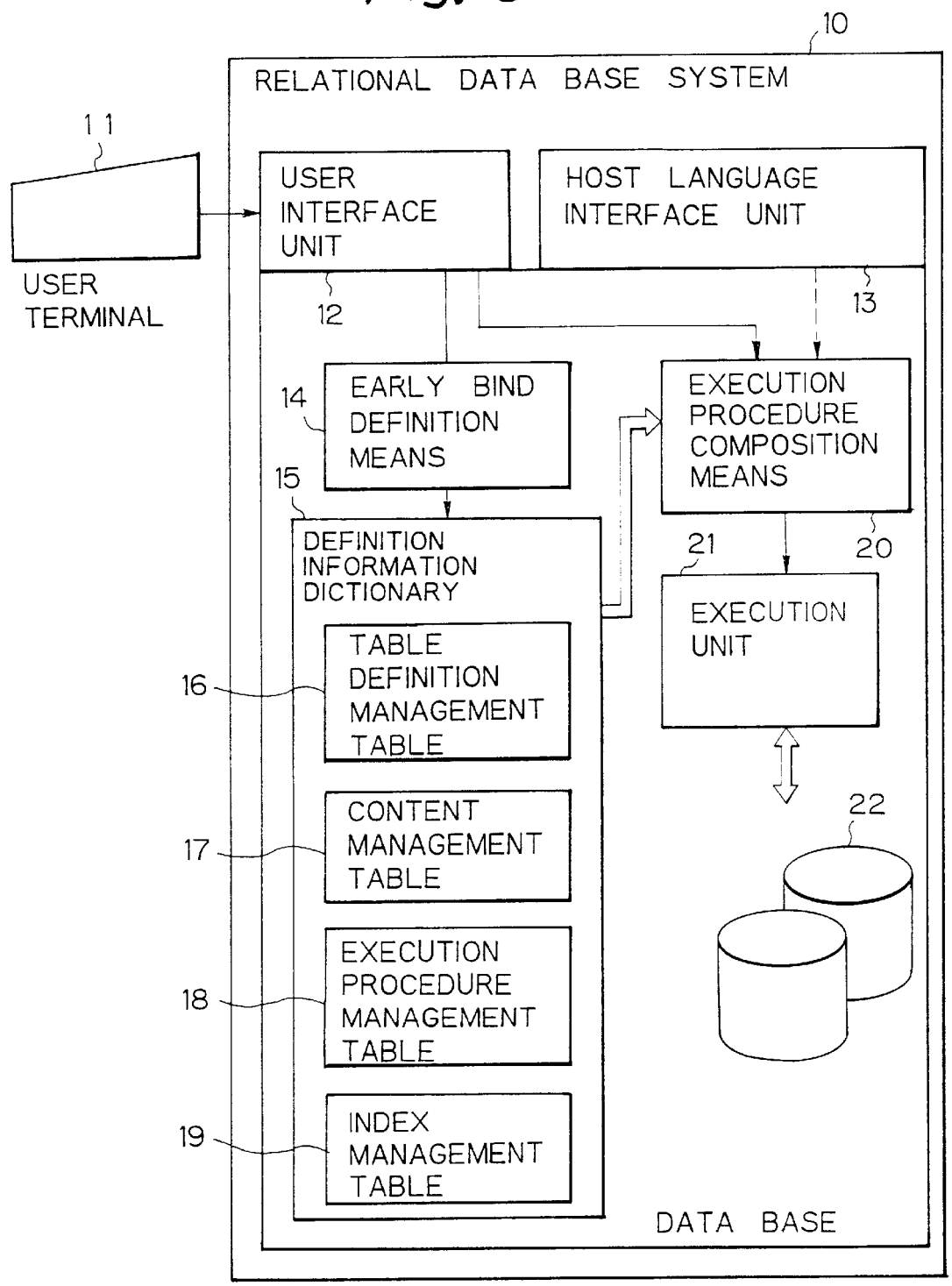
FIG. 3 is a basic structural view of a relational data base system according to the present invention.

FIG. 3 is a basic structural view of a relational data base system according to the present invention. In FIG. 3, reference number 10 denotes a relational data base system including a central processing unit CPU (not shown), and 11 denotes a user terminal having a display and a keyboard. The following units are provided in the relational data base system.

Reference number 12 denotes a user interface unit connected to the user terminal 11 for inputting the query text by the SQL, 13 denotes a host language interface unit for processing the query to the data base when this unit is accessed by another host language, for example, "COBOL" or "PL/1".

Reference number 14 denotes an early bind definition means for the view table. As is known, the "bind" process changes an SQL sentence to machine code readable by the relational data base. The bind process involves at least three basic procedures, i.e., to investigate whether or not the description of the SQL is correct, to investigate a table to be coupled to the SQL, and to change the SQL sentence to executable machine code. In this case, an "early" bind is performed in the definition stage. On the contrary, a "late" bind is performed in the execution stage. The present invention relates to the early bind definition for a view table.

Reference number 15 denotes a definition information dictionary for storing various information regarding the definition, for example, the logical structure/storage structure of the view and actual tables. 16 denotes a table definition management table for storing the definition information for the view table; 17 denotes a content management table for storing the content defined in the view table; 18 denotes an execution procedure management table for storing a previously created execution procedure for the actual and view tables; 19 denotes an index management table for storing index information provided in accordance with the storage structure of the actual table; 20 denotes an execution procedure composition means for composing the execution procedure when the SQL text is used as the query sentence; 21 denotes an execution unit for performing the execution procedure; and 22 denotes a data base.

In the present invention, the view resolution method is used as the basic concept thereof. However, the optimization process shown in FIG. 2 is not necessary for the present invention so that it is possible to reduce the response time to the data base as explained below.

The early bind definition means 14 creates a plurality of execution procedures in advance to realize a query to a defined view table in accordance with the query structure of the view table. The execution procedures created by the early bind definition means 14 are stored in the execution procedure management table 18. The table definition management table 16 records assignment of any execution procedure to a given view table.

When a query to a defined view table is input from the user terminal 11 to the execution procedure composition means 20 through the user interface unit 12, the execution procedure composition means 20 takes the corresponding execution procedure from the execution procedure management table 18 to realize that query, and adds other supplemental procedures to the execution procedure to compose the desired execution procedure for the input query.

The execution unit 21 executes the composed execution procedures to access to the data base 22.

The early bind definition means 14, particularly, performs the following processes in the definition stage of the view table.

(1) The early bind definition means 14 creates the optimum execution procedure for the query to the view table, and estimates the response time (t1) at the execution stage when this execution procedure is performed. Further, when the view resolution method is performed (see, FIG. 2 and its explanation), the early bind definition means 14 estimates the minimum response time (t2) necessary for the creation of the optimum execution procedure after the view resolution is performed.

When the response time t1 is smaller than the minimum response time t2, it means that the view resolution method takes much more time than the execution procedure of the present invention in the query to the view table.

(2) When the response time t1 is larger than or equal to the minimum response time t2, it means that the total response time of the view resolution method may be smaller than the present invention. Accordingly, to reduce the response time t1 so as to become smaller than the response time t2, the early bind definition means 14 prepares an execution procedure in advance to establish "reduction conditions", i.e., conditions under which a record having a particular condition can be selected from the table using indices. The reduction conditions utilize, for example, an index of the part-numbers and stock-numbers. To prepare the execution procedure to establish the reduction conditions, the early bind definition means 14 predicts the structure of the query to the view table, creates the various optimum execution procedures predicted, and holds them in the execution procedure management table 18. These execution procedures contain information as to the query structure (for example, column conditions) of the predicted view table.

The execution procedure composition means 20 performs the following process in the query to the view table.

(1) When the query structure to the view table is not a simple designation of conditions, the execution procedure composition means 20 selects and creates the optimum execution procedure based on the view resolution method.

(2) When the query structure to the view table is a simple designation of conditions, the execution procedure composition means 20 selects the optimum execution procedure from one or more execution procedures previously created in the above process, adds a supplemental limitation and selection of the column to the optimum execution procedure, and composes (creates) a new execution procedure for the query to the view table. The selection of the optimum execution procedure can be realized by verifying the structure of the query to the view table with the prediction of the query structure corresponding to the stored execution procedure.

(3) As a result of verification, when the structure of the query to the view table is the query structure excluding prediction, the execution procedure composition means 20 creates the optimum execution procedure in accordance with the view resolution method shown in FIG. 2.

The present invention is mainly utilized for the query text input through the user interface unit 12. Further, as shown in FIG. 3, the present invention can be utilized for dynamic SQL which dynamically creates the query text in a host language through the host language interface unit 13.

When the query text is statistically set in advance to the host language, the execution procedure according to the present invention is not necessary since an execution object is coupled by the bind process in a compiling process.

The basic process of the present invention is as follows. In the definition of the view table in the relational data base using the SQL language, the execution procedure to realize the query to the content defined in the view table is created in advance and held in the definition stage of the view table. Further, for the query sentence designating this view table, the execution procedures are created (or, composed) by utilizing the execution procedure corresponding to the view table previously created.

Based on the above procedures, when the user inputs the query sentence in the form of text in the execution stage and accesses the data base, it is possible to considerably reduce creation time of the execution procedure so that it is possible to considerably reduce the response time in comparison with the case in which the execution procedure is not created in the definition stage of the view table.

Dependent on the storage structure of the actual table which is the object of the query to the view table, plural suitable execution procedures are created in advance under expectation of the query structure to the view table. In the stage after analysis of the query to the view table, desired execution procedure is selected from plural execution procedures.

Expecting not only the keyword (statement) "SELECT", but also keywords "DELETE", "UPDATE", and "INSERT" as the query to the view table, the execution procedure can be created corresponding to each keyword.

Figure 4:
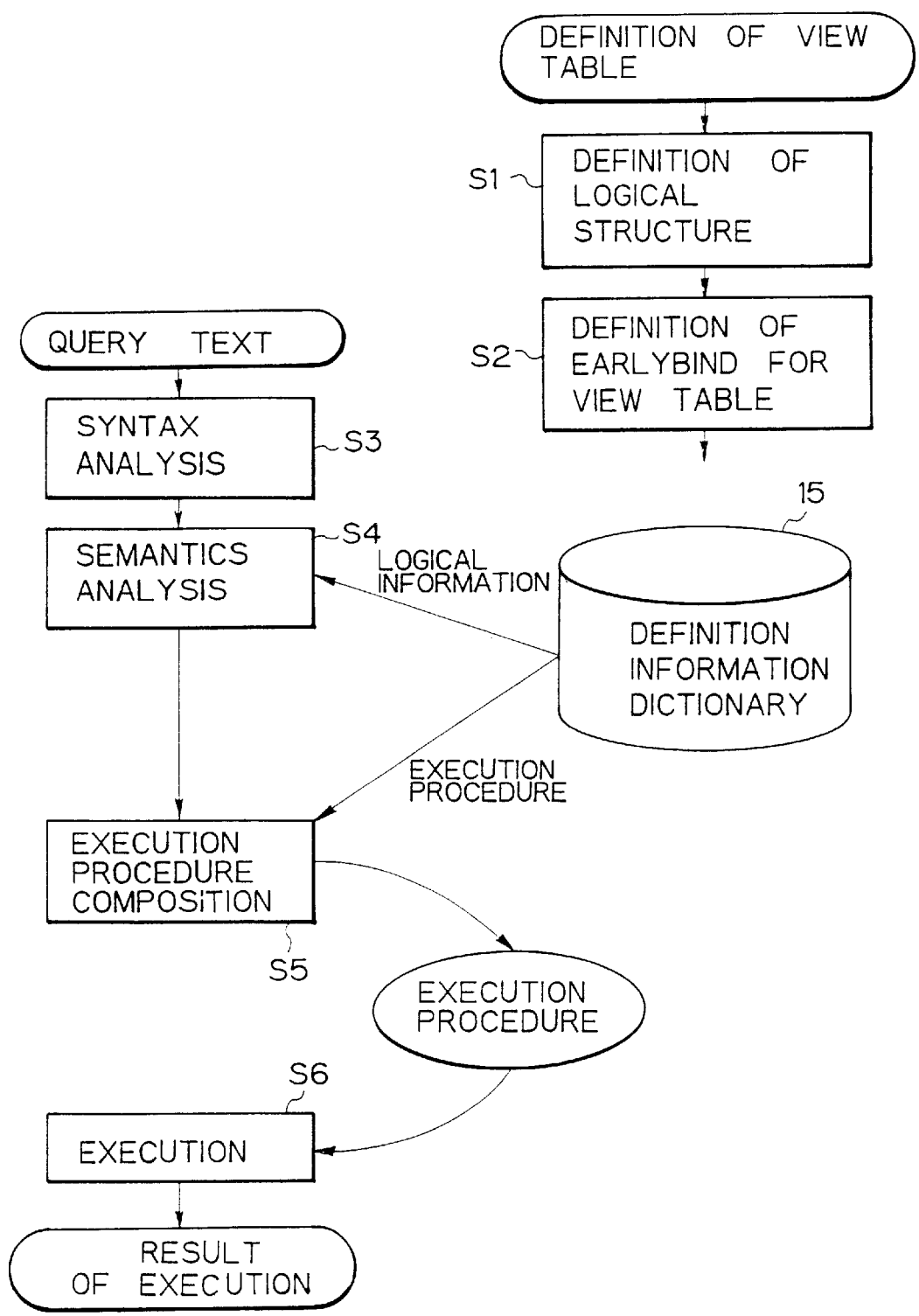
FIG. 4 is a basic processing flowchart according to the present invention, FIGS. 5A and 5B comprise an explanatory view of a definition of an early bind for a view table according to an embodiment of the present invention, FIGS. 6A and 6B comprise is an explanatory view of a composition of an execution procedure according to the present invention, FIGS. 7A and 7B comprise is a flowchart for explaining the process of an early bind definition means according to the present invention, and FIGS. 8A and 8B comprise is a flowchart of the creation process of an execution procedure according to the present invention.

FIG. 4 is a basic processing flowchart according to the present invention.

In step S1, the query sentence defined in the view table is analyzed in the definition stage of the view table, and the information defined in the logical structure is registered in the definition information dictionary 15.

In step S2, when there is a designation to the view table with the early bind in the definition of the view table as an objective, the execution procedure for realizing the query to the view table is created and held in the definition information dictionary 15. This creation and registration of the execution procedure is called "definition of early bind".

In step S3, for example, the query text to the view table by the SQL language is input to the syntax analysis means to analyze its syntax. This step is the same as that of FIG. 2.

In step S4, the semantics analysis means refers to the logical information from the definition information dictionary 15, and analyzes the semantics of the query text. At that time, the semantics analysis means determines whether or not a usable execution procedure exists, and decides whether the conventional view resolution should be taken, or the execution procedure of the present invention should be taken.

In step S5, when a usable execution procedure exists, the execution procedure composition means 20 composes the execution procedure for the query to the view table after addition of the supplemental conditions and selection of a column.

In step S6, finally, the composed execution procedure is executed so that it is possible to achieve the execution result of the query.

Figure 5B:
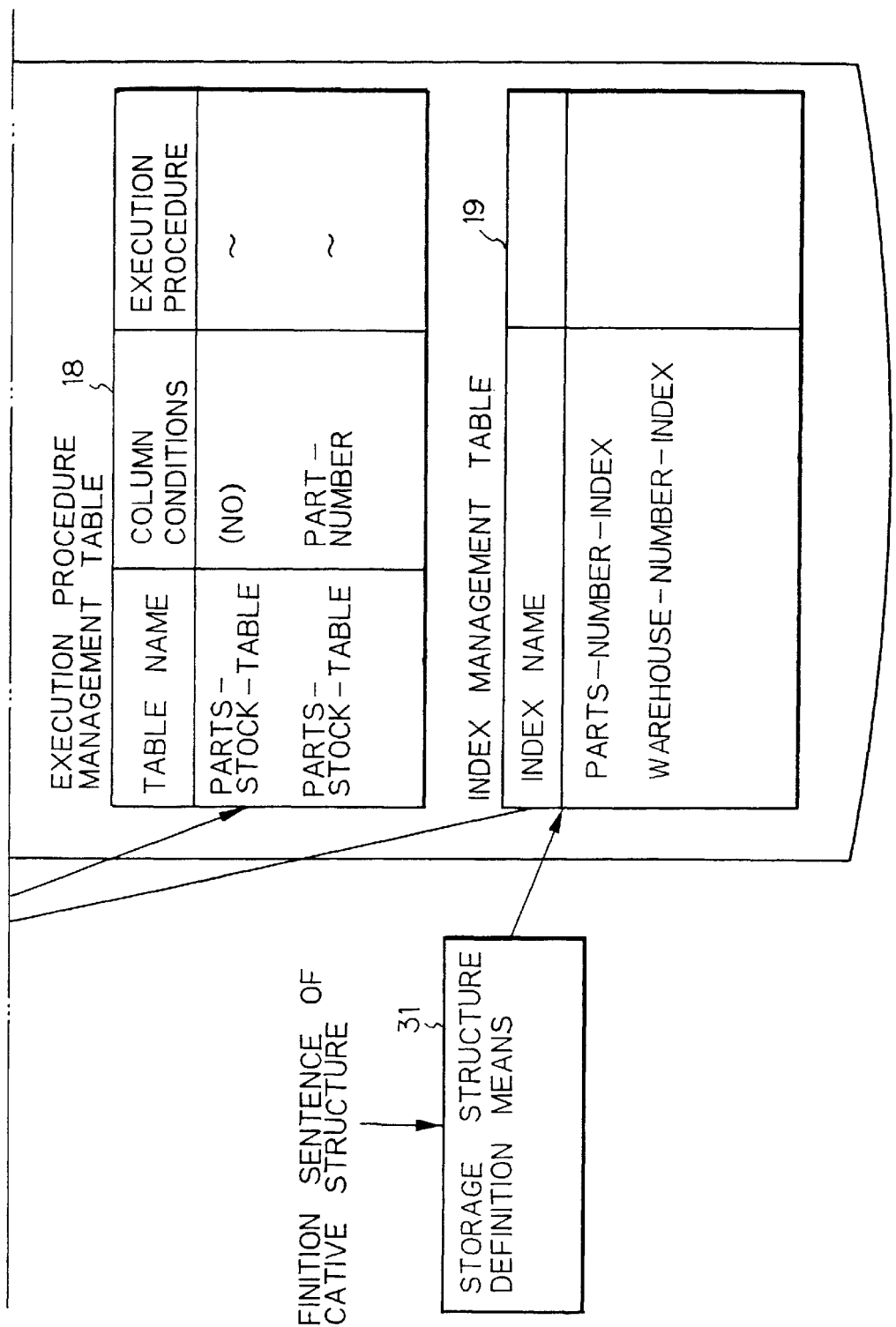

FIG. 5 is an explanatory view of definition of an early bind for the view table according to an embodiment of the present invention.

As shown in FIG. 5, the relational data base system according to the present invention is basically formed by a logical structure definition means 30, a storage structure definition means 31, and an early bind definition means 14 for the view table. In this case, the storage structure definition means 30 and the storage structure definition means 31 are provided in the conventional art.

The definition information dictionary 15 includes the table definition management table 16, the content management table 17 of the view table, the execution procedure management table 18, and the index management 19. The table definition table 18 has the parts-warehouse-table and the parts-stock-table. "EB" denotes an identification of the early bind. "base denotes the actual table, and "view" denotes the view table.

The early bind definition means 14 designates the view table defined by the logical structure definition means 30, and creates the execution procedure. The created execution procedure is stored in the execution procedure management table 18. Further, the identification EB indicates whether or not the execution procedure of this view table is already created, and the EB is attached to the table definition management table 16. "YES" denotes that the execution procedure of this view table is already created. As shown in the drawing, the early bind definition means 14 of the present invention is operatively connected to all tables 16 to 19 in the definition information dictionary 15, and the operation of the early bind definition means 14 is explained in detail in relation to FIG. 7.

FIG. 6 is an explanatory view of the "composition" of the execution procedure according to the present invention. In FIG. 6, the query to the view table is input to the syntax analysis processing means 40. The result of the analysis is input to the semantics analysis processing means 41, and the semantics analysis processing means 14 refers to the table definition management table 16 to investigate as to whether or not the object table is the view table, and whether the early bind is "YES" or not.

When the object table is the view table, and the early bind EB is YES, the execution procedure composition means 20 tries to utilize the created execution procedure based on the structure of the query instead of the conventional view resolution method. In this case, when there is an execution procedure which has column conditions adapted to the conditions included in the query, the execution procedure composition means 20 adds conditions of supplemental limitation and a calculation procedure of a selection formula to the above execution procedure, and composes the execution procedure for the query input from the user terminal.

One example of the present invention is explained based on the SQL language which is well-known as a language used to access a relational data base.

The sentence defined in the table is expressed as follows. This sentence corresponds to a definition sentence of the view table shown in FIG. 5. In this case, the parts warehouse table indicates that stock of the same parts is distributed in a plurality of warehouses.

```
CREATE TABLE parts warehouse table (
part-number            INTEGER NOT NULL,
warehouse-number       INTEGER NOT NULL,
amount-of-stock        INTEGER )
```

Where, "INTEGER" denotes that this column is expressed by an integer, and "NULL" denotes that the warehouse is not determined. Further, "NOT NULL" denotes that the term "NULL" should not be entered in this column".

As shown in FIG. 5, when the above sentence defined in the table is input to the logical structure definition means 30, the logical structure definition means 30 registers this content into the table definition management table 16.

As the storage structure of this table, two indexes are attached to part numbers and the warehouse numbers as follows.

CREATE INDEX part number index

ON part-warehouse-table (part-numbers, warehouse-number)

CREATE INDEX warehouse-number-index

ON part warehouse-table (warehouse-number)

As shown in FIG. 5, when the definition sentence having this storage structure is input to the storage structure definition means 31, the storage structure definition means 31 registers the defined information for the index into the index management table 19.

As one example, when the user requests only the total amount of the same parts stored in all of the warehouses, the following view table is defined.

```
CREATE VIEW    parts-stock-table (part-number, amount-
               of-stock)
AS SELECT      part-numbers, SUM (amount-of-stock)
FROM           parts-warehouse-table
GROUP          part-numbers
```

In this definition stage of the view table, first, the content of the definition of the view table is held in the content management table 17 of the view table shown in FIG. 5. This is done in anticipation of the view resolution method. Further, the present invention creates the optimum execution procedure for the query below the "AS" of the view table (below, execution procedure "a").

When the execution time according to the above process may be sufficiently short in comparison with creation time for the execution procedure at the execution stage, the execution procedure created in the definition stage of the view table is determined as explained above.

On the contrary, when the execution time according to the above process is long in comparison with the creation time of the execution procedure at the execution stage, an executable high speed procedure is created in anticipation of designation of the conditions in the parts stock table. This procedure is performed based on the storage structure set for the table.

When applying the conditions to the parts-stock-table, the warehouse number index is not utilized since the warehouse number can not be designated. Accordingly, the use of the parts-number-index is anticipated. This corresponds to the anticipation for designation of the conditions regarding the part-number in the query to the part-stock-table.

The optimum execution procedure is created in the case that the conditions for the parts number (below, execution procedure "b") are designated. At the same time, the fact that this execution procedure is obtained by "reduction conditions" for the part-number is stored in the column of the column conditions in the execution procedure management table 18.

The query to the part-stock-table as the view table may take various forms as follows. When the query to the part-stock-table is input to the syntax analysis processing means 40 in FIG. 6, the syntax analysis processing means 40 analyzes the syntax of the query text. Further, the semantics analysis processing means 41 selects the conditions, and the execution procedure composition means 20 composes the execution procedure by utilizing the execution procedure registered in the execution procedure management table 18 as explained below.

(1) Unconditional retrieval

| SELECT | part-number, amount-of-stock |
|--------|------------------------------|
| FROM   | parts-stock-table            |

In this case, the optimum execution procedure "a" created below "AS" of the view table can be utilized. At that time, the procedure to process the selection formula is added to the above in accordance with necessity. The following is necessary in the case of designation of a selection formula different from the structure described below "AS"

| SELECT | parts-stock-number, amount-of-stock/100 |
|--------|------------------------------------------|
| FROM   | parts-stock-table                        |

The process for the selection formula is the same in the following example.

(2) Conditional retrieval (non-coincidence)

| SELECT | parts-number, amount-of-stock |
|--------|-------------------------------|
| FROM   | parts-stock-table             |
| WHERE  | amount-of-stock > 100         |

When the conditions are designated in the query to the view table, the execution procedure "b", which is created based on the "prediction" of the conditions, is investigated. In this case, since the execution procedure corresponding to the conditions regarding the amount of stock is not created, the "reduction" procedure based on the designated conditions is added to the above procedure based on the optimum execution procedure "a" which is created below "AS" of the definition of the view table.

(3) Conditional retrieval (coincidence)

| SELECT | part-number, amount-of-stock |
|--------|------------------------------|
| FROM   | parts-stock-table            |
| WHERE  | part-number = 100            |

The designation of the conditions regarding the part-number is created based on the execution procedure "b" which is created in accorance with the "prediction" of the conditions. Accordingly, this execution procedure is executed after the corresponding value (100) is applied to the procedure as a parameter.

(4) Complex retrieval

| SELECT | part-name, amount-of-stock |
|--------|----------------------------|
| FROM   | parts-stock-table          |
| WHERE  | parts-stock-table, part-number = name table, part-number |

In the complex case as shown above, the creation of the execution procedure is performed based on the view resolution method in the conventional art without utilization of the execution procedure previously created.

Figure 7B:
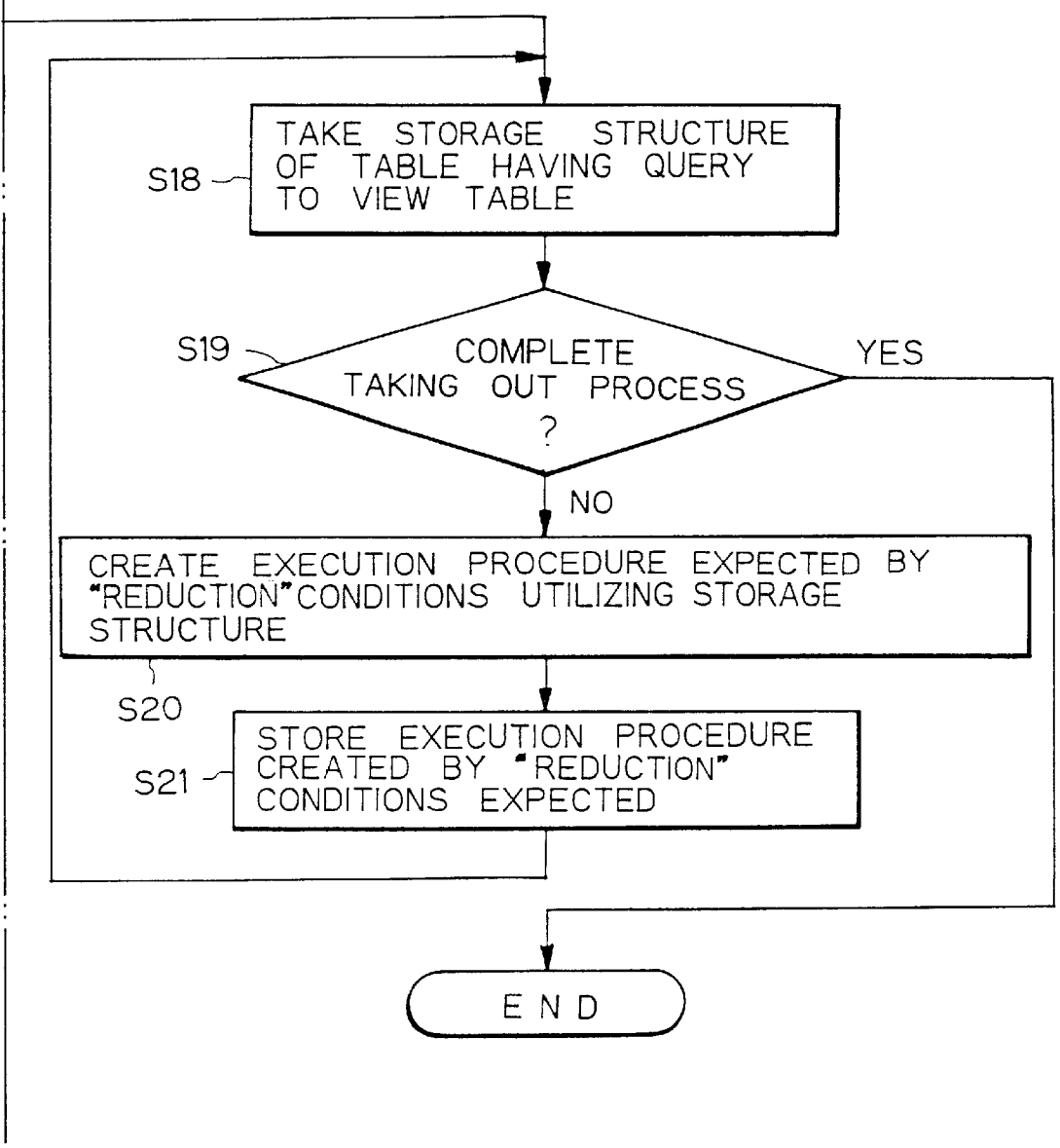

FIG. 7 is a flowchart for explaining the process of an early bind definition means according to the present invention.

(S11) The early bind definition means 14 receives the designation of the object view table of the early bind, and indicates that the designated view table has an execution procedure in the table definition management table 16. In this case, the early bind "EB" is set to "YES".

(S12) The early bind definition means 14 takes the content of the definition of the designated view table from the content management table 17.

(S13) The early bind definition means 14 creates the optimum execution procedure for the designation of the query to the definition of the view table.

(S14) The early bind definition means 14 stores the created execution procedure into the execution procedure management table 18. At that time, the column conditions is set to "NO".

(S15) The early bind definition means 14 estimates the response time at the execution stage of the execution procedure created. The response time is shown by "t1".

(S16) The early bind definition means 14 estimates the minimum response time necessary for creation of the optimum execution procedure. This minimum response time is shown by "t2".

(S17) The early bind definition means 14 compares the response time t1 with the minimum response time t2.

When the response time t1 is smaller than the minimum response time t2 (YES), the optimum execution procedure created at step (S13) is utilized so that it is possible to execute the procedure with higher speed than the conventional view resolution method.

When the response time t1 is larger than the response time t2 (NO), the process goes to step (S18) to create a high speed execution procedure utilizing the index in accordance with the query structure. Based on the step (S17), it is possible to avoid creation in advance of unnecessary execution procedures for the view table.

(S18) The early bind definition means 14 takes the storage structure having the query to the view table from the index management table 19 on a one by one basis.

(S9) When this process is completed for all storage structures (YES), the process of the early bind definition is completed.

(S20) When the process is not completed for all storage structures (NO), the early bind definition means 14 creates the execution procedure by predicting the "reduction" conditions utilizing the above storage structure (for example, index).

(S21) The early bind definition means 14 stores the created execution procedure in the execution procedure management table 18. At that time, the information of the "reduction" conditions (for example, use of "part-number" as the column conditions) is set in the execution procedure management table 18. This step (S21) then returns to the step (S18), and the same steps (S19) to (S21) are repeated.

Figure 8A:
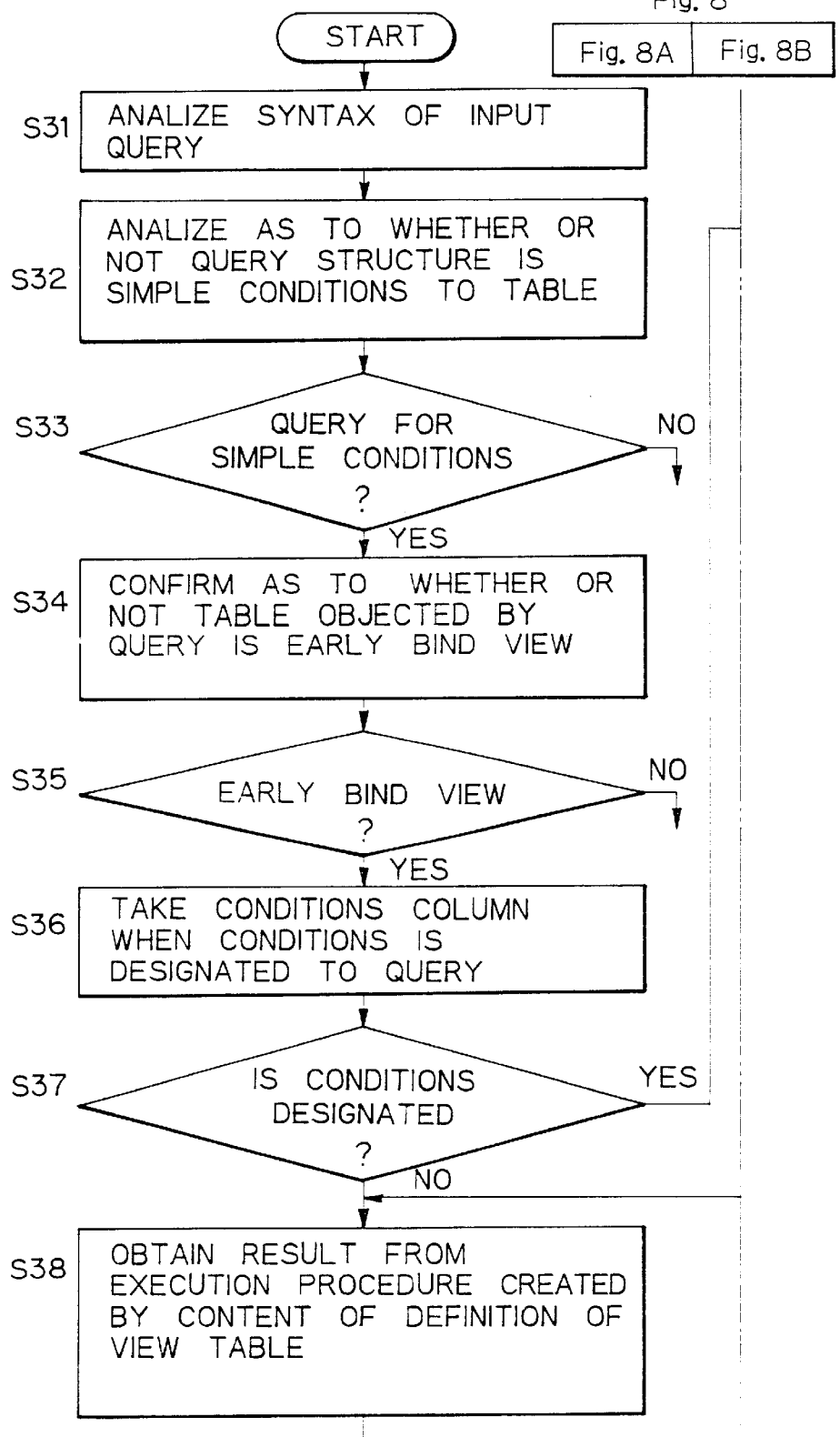
Figure 8B:
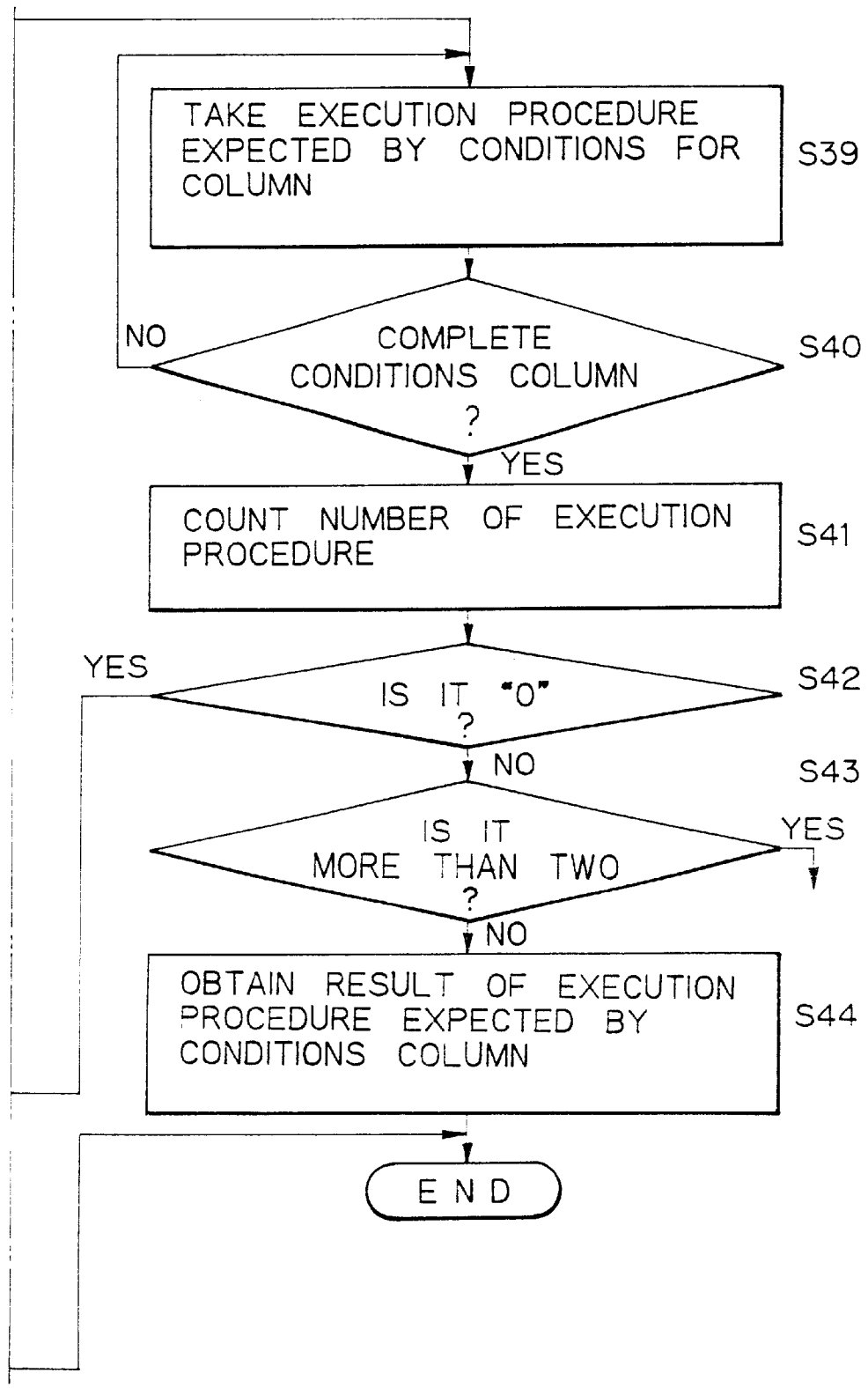

FIG. 8 is a flowchart of creation of an execution procedure according to the present invention.

(S31) The syntax analysis processing means 40 analyzes the syntax of the query when receiving a query in the SQL language.

(S32) Further, the syntax analysis processing means 40 analyzes whether or not the query structure is simple conditions of the table.

(S33) When it is not simple conditions of the query (NO), the execution procedure is created based on the conventional procedures, i.e., the view resolution method.

(S34) When it is simple conditions of the query (YES), the semantics analysis processing means 41 refers to the table definition management table 16 shown in FIG. 6, and investigates whether or not the object table of the query is an early bind view table.

(S35) When it is not an early bind view table (NO), i.e., when the execution procedure has not been created, the execution procedure is created based on the conventional procedures, i.e., the view resolution method.

(S36) When it is an early bind view table (YES), and when there is a designation of the conditions (for example, a WHERE phrase) in the input query, the semantics analysis processing means 41 takes the conditions column from the execution procedure management 18.

(S37) When the corresponding designation of the conditions is given (YES), the procedure goes to the step (S39). When the designation of the conditions is not given (NO), the step (S38) is executed.

(S38) The execution procedure composition means 20 takes the execution procedure (the procedure in which the column conditions is "NO") created from the content of the definition of the view table, and obtains result of the execution procedure.

(S39) When the designation of the conditions is given, the execution procedure composition means 20 takes the execution procedure predicting the conditions to each conditions column from the execution procedure management table 18 one by one.

(S40) When the conditions column is not completed (NO), the step (S39) is repeated until the conditions column is completed.

(S41) When the conditions column is completed (YES), the execution procedure composition means 20 counts the number of the execution procedures.

(S42) When the number of the execution procedures is "0" (YES), the procedure goes to the step (38).

(S43) When the number of the execution procedures is not "0" (NO) in step (S42), and when it is more than two (YES), the execution procedure is created based on the conventional procedure since it is not clear which execution procedure is optimum. That is, "optimization" is performed to create the execution procedure for the query.

(S44) When the number of the execution procedures is smaller than two (NO), i.e., it is only one, the execution procedure composition means obtains the execution procedure expected from conditions column.

What is claimed is:

1. A relational data base system having a function of view resolution for analyzing a query sentence in an execution procedure for a query from a user, using a content defined in a view table for the query designating the view table, converting a retrieval of the view table to that of an actual table, and creating the execution procedure, the system comprising:

early bind definition means for creating and updating by an evaluation execution time a plurality of execution procedures when the view table is defined and before a query is inputted, to realize the query subsequently inputted to the view table in accordance with a query structure to the view table;

a definition information dictionary operatively connected to the early bind definition means to store information;

execution procedure management means provided in the definition information dictionary for storing said plurality of execution procedures to realize the query subsequently inputted to the view table;

execution procedure composition means operatively connected to the definition information dictionary for retrieving, based on object query conditions, a corresponding one of the plurality of execution procedures stored in the definition information dictionary when the query to the view table is inputted, for extracting the one execution procedure adapted to the query, and for composing the extracted execution procedure with the query; and execution means operatively connected to the execution procedure composition means for executing the composed execution procedure.

2. A relational data base system as claimed in claim 1, wherein the definition information dictionary further comprises:

a table definition management table for storing a type of table and an indication of an early bind for the view table;

a content management table for storing the content defined in the view table; and an index management table for storing a name of an index.

3. A relational data base system as claimed in claim 1, wherein the execution procedure management means comprises column conditions for the view table, and wherein one of said plurality of execution procedures executes contents described in the column conditions.

4. A relational data base method for analyzing a query sentence in an execution procedure for a query from a user, using a content defined in a view table for the query designating the view table, converting a retrieval of the view table to that of an actual table, and creating the execution procedure, the method comprising the steps of:

creating and updating by an evaluation execution time a plurality of execution procedures when the view table is defined and before a query is inputted, to realize the query subsequently inputted to the view table in accordance with a query structure to the view table;

storing information and said plurality of execution procedures to realize the query subsequently inputted to the view table;

retrieving, based on object query conditions, a corresponding one of the stored plurality of execution procedures when the query to the view table is inputted, extracting the one execution procedure adapted to the query, and composing the extracted execution procedure with the query; and executing the composed execution procedure.

* * * * *